US012268644B2

(12) United States Patent
Ebrahimi Afrouzi et al.

(10) Patent No.: US 12,268,644 B2
(45) Date of Patent: Apr. 8, 2025

(54) AUTONOMOUS HOSPITAL BED

(71) Applicants: Ali Ebrahimi Afrouzi, Henderson, NV (US); Lukas Robinson, York (CA)

(72) Inventors: Ali Ebrahimi Afrouzi, Henderson, NV (US); Lukas Robinson, York (CA)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 18/429,531

(22) Filed: Feb. 1, 2024

(65) Prior Publication Data

US 2024/0173184 A1 May 30, 2024

Related U.S. Application Data

(63) Continuation of application No. 18/116,635, filed on Mar. 2, 2023, now Pat. No. 11,911,328, which is a continuation of application No. 17/237,905, filed on Apr. 22, 2021, now Pat. No. 11,628,112, which is a continuation of application No. 16/399,368, filed on Apr. 30, 2019, now Pat. No. 11,013,655.

(60) Provisional application No. 62/746,688, filed on Oct. 17, 2018, provisional application No. 62/740,573, filed on Oct. 3, 2018, provisional application No. 62/740,580, filed on Oct. 3, 2018, provisional application No. 62/688,497, filed on Jun. 22, 2018, provisional application No. 62/674,994, filed on May 22, 2018, provisional application No. 62/669,509, filed on May 10, 2018, provisional application No. 62/665,095, filed on May 1, 2018, provisional application No. 62/664,834, filed on Apr. 30, 2018.

(51) Int. Cl.
*A61G 7/10* (2006.01)
*A61G 7/018* (2006.01)

(52) U.S. Cl.
CPC ........... *A61G 7/1046* (2013.01); *A61G 7/018* (2013.01)

(58) Field of Classification Search
CPC ........ A61G 7/1046; A61G 7/018; A61G 7/08; A61G 2203/22
See application file for complete search history.

(56) References Cited

U.S. PATENT DOCUMENTS

| | | | | |
|---|---|---|---|---|
| 9,229,905 | B1 * | 1/2016 | Penilla | G06Q 20/18 |
| 9,946,259 | B2 * | 4/2018 | Keller | G01S 17/931 |
| 2005/0054381 | A1 * | 3/2005 | Lee | G06F 9/451<br>455/557 |
| 2012/0323432 | A1 * | 12/2012 | Wong | G05D 1/0274<br>701/25 |

(Continued)

*Primary Examiner* — Rodney A Butler

(57) ABSTRACT

A method for operating an autonomous wheeled device, including: obtaining first data indicative of objects within an environment; generating, with a processor of the autonomous wheeled device, a map of the environment using the first data; transmitting, with the processor, first information to an application of a smartphone; proposing, with the application, a suggested schedule for the autonomous wheeled device; receiving, with the processor, second information from the application of the smartphone; and actuating, with the processor, the autonomous wheeled device to operate according to the new schedule or the adjustment to the existing schedule and the suggested schedule, wherein the processor only actuates the autonomous wheeled device to operate according to the suggested schedule after the application receives approval of the suggested schedule.

20 Claims, 5 Drawing Sheets

(56) References Cited

U.S. PATENT DOCUMENTS

| | | | | |
|---|---|---|---|---|
| 2015/0338852 | A1* | 11/2015 | Ramanujam | G01C 21/26 701/2 |
| 2018/0281657 | A1* | 10/2018 | Healey | G06Q 30/06 |
| 2019/0025843 | A1* | 1/2019 | Wilkinson | G01C 21/3407 |
| 2019/0306284 | A1* | 10/2019 | Fu | G01S 15/50 |

* cited by examiner

AUTONOMOUS HOSPITAL BED

CROSS-REFERENCE TO RELATED APPLICATIONS

This application is a Continuation of U.S. Non-Provisional patent application Ser. No. 18/116,635, filed Mar. 2, 2023, which is a Continuation of U.S. Non-Provisional patent application Ser. No. 17/237,905, filed Apr. 22, 2021, which is a Continuation of U.S. Non-Provisional patent application Ser. No. 16/399,368, filed Apr. 30, 2019, which claims the benefit of U.S. Provisional Patent Application Nos. 62/664,834, filed Apr. 30, 2018, 62/746,688, filed Oct. 17, 2018, 62/665,095, filed May 1, 2018, 62/674,994, filed May 21, 2018, 62/688,497, filed Jun. 22, 2018, 62/740,573, filed Oct. 3, 2018, 62/740,580, filed Oct. 3, 2018, and 62/669,509, filed May 10, 2018, each of which is hereby incorporated by reference.

In this patent, certain U.S. patents, U.S. patent applications, or other materials (e.g., articles) have been incorporated by reference. Specifically, U.S. patent application Ser. Nos. 15/272,752, 15/949,708, 16/048,179, 16/048,185, 16/163,541, 16/163,562, 16/163,508, 16/185,000, 62/681,965, 16/051,328, 15/449,660, 16/297,508, 62/740,573, 62/740,580, 15/955,480, 15/425,130, 15/955,344, 15/981,643, 62/746,688, 62/665,095, 62/674,994, 62/688,497, and 62/669,509, are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to hospital beds, and more specifically to autonomous hospital beds.

BACKGROUND

Hospital beds are a core piece of equipment used in hospitals and other medical facilities. In some cases, hospital beds are used to transport patients between different areas of a facility (e.g., for treatment). In other cases, unused hospital beds are transported from one location to another for use (e.g., in cases of emergency). In certain instances, transportation of hospital beds from one area of a facility to another is delayed due to the innate busyness of medical facilities or the size of medical facilities (e.g., unused hospital beds stored in an opposite wing of a medical facility). Autonomous hospital beds have the potential to streamline processes in hospitals and improve both workflow for medical staff and patient care.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects include a method for operating an autonomous wheeled device, including: obtaining, with at least a first sensor disposed on the autonomous wheeled device, first data indicative of objects within an environment of the autonomous wheeled device; generating, with a processor of the autonomous wheeled device, a map of the environment using at least some of the first data; transmitting, with the processor, first information to an application of a smartphone paired with the autonomous wheeled device, the first information including at least the map; proposing, with the application of the smartphone, a suggested schedule for the autonomous wheeled device to a user, the suggested schedule including at least one day and time; receiving, with the processor, second information from the application of the smartphone, the second information including at least each of: a new schedule or an adjustment to an existing schedule, at least one setting of the autonomous wheeled device, an instruction to execute a particular action, an instruction to modify the map of the environment, and an indication of an approval of the suggested schedule; and actuating, with the processor, the autonomous wheeled device to operate according to the new schedule or the adjustment to the existing schedule and the suggested schedule, wherein the processor only actuates the autonomous wheeled device to operate according to the suggested schedule after the application receives approval of the suggested schedule; wherein: the application displays the map of the environment; and the second information is designated by the user via user input received by the application of the smartphone.

Some aspects provide an autonomous wheeled device, including: a frame; a set of wheels; a plurality of sensors; a processor; a tangible, non-transitory, machine readable medium storing instructions that when executed by the processor effectuate operations including: obtaining, with at least a first sensor disposed on the autonomous wheeled device, first data indicative of objects within an environment of the autonomous wheeled device; generating, with the processor, a map of the environment using at least some of the first data; transmitting, with the processor, first information to an application of a smartphone paired with the autonomous wheeled device, the first information including at least the map; receiving, with the processor, second information from the application of the smartphone, the second information including at least each of: a new schedule or an adjustment to an existing schedule, at least one setting of the autonomous wheeled device, an instruction to execute a particular action, an instruction to modify the map of the environment, and an indication of an approval of a suggested schedule; and actuating, with the processor, the autonomous wheeled device to operate according to the new schedule or the adjustment to the existing schedule and the suggested schedule; wherein: the application of the smartphone proposes the suggested schedule for the autonomous wheeled device to the user, the suggested schedule including at least one day and time; the processor only actuates the autonomous wheeled device to operate according to the suggested schedule after the application receives approval of the suggested schedule; the application displays the map of the environment; and the second information is designated by the user via user input received by the application of the smartphone.

DETAILED DESCRIPTION OF SOME EMBODIMENTS

Figure 1:
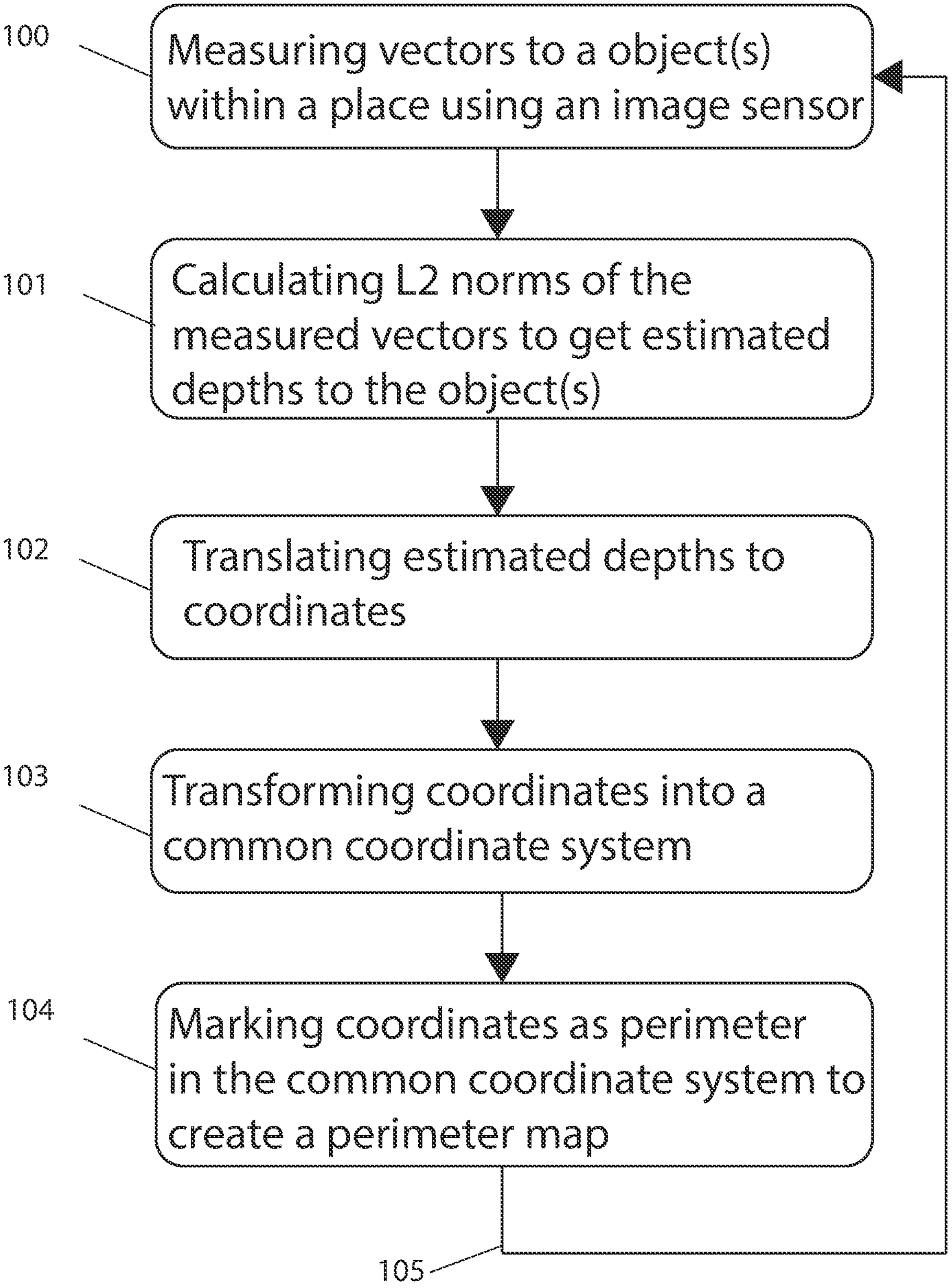
FIG. 1 illustrates a flowchart describing an example of a method for generating a map of an environment, according to some embodiments.

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments provide an autonomous hospital bed that can autonomously operate (e.g., transporting patients from one area to another, navigating to an area where an unused hospital bed is needed, etc.) within a hospital or medical facility environment or other type of environment. In some embodiments, the autonomous hospital bed includes communication, mobility, and processing elements. In some embodiments, the hospital bed includes a frame, a set of wheels attached the frame, a motor to drive the wheels, a mattress positioned on the frame, a processor, a controller, memory, network or wireless communications (e.g., Wi-Fi or Bluetooth), power management (e.g., a battery for storing and delivering electrical power), etc., and a synchronizing device. In some embodiments, the hospital bed further includes sensors for external (e.g., observing the environment) and internal (e.g., observing wheel rotation or status) observations. Sensors may include sensors for detecting or measuring obstacles, types of flooring, cliffs, system status, temperature, weight, and movement. Examples of such sensors include IR sensors, TOF sensors, TSSP sensors, tactile sensors, sonar sensors, gyroscopes, optical encoders, ultrasonic range finder sensors, depth sensing cameras, odometer sensors, optical flow sensors, LIDAR, LADAR, cameras, IR illuminators, and RF transmitter/receiver. In some embodiments, the autonomous hospital bed includes a graphical user interface that provides a means for communication between the hospital bed and a user. Other types of hospital beds with other configurations may also be used and implement the techniques described herein.

In some embodiments, the processor of the autonomous hospital bed generates a map of the environment. For example, in some embodiments, an image sensor, installed on the hospital bed, acquires data to estimate depths from the image sensor to objects within a first field of view. In one embodiment, the image sensor measures vectors from the image sensor to objects in the environment and the processor calculates the L2 norm of the vectors using $\|x\|_p=(\Sigma_i|x_i|^P)^{1/P}$ with P=2 to estimate depths to objects. In some embodiments, the processor translates each depth estimate into a coordinate by iteratively checking each coordinate within the observed coordinate system of the hospital bed until the coordinate that coincides with the location of the depth estimated is identified. Each coordinate of the coordinate system coincides with a location within the environment. The coordinate system may be of different types, such as Cartesian, polar, homogenous, or another type of coordinate system. In some embodiments, the processor identifies the coordinates coinciding with the depths estimated as perimeters of the environment while coordinates bound between the perimeter coordinates and the limits of the first field of view of the image sensor are identified as an internal area. In one embodiment, coordinates representing the perimeters of the environment are stored in memory of the hospital bed in the form of a matrix or finite ordered list. In another embodiment, the processor marks the coordinates representing the perimeters of the environment in a grid to create a visual map of the environment. In other embodiments, perimeter coordinates are stored or represented in other forms. In some embodiments, coordinates corresponding to internal areas may be stored or marked in a similar fashion. In some embodiments, the hospital bed moves within the environment. As the hospital with mounted image sensor moves within the environments, the image sensor continuously acquires data and the processor continuously estimates depths from the image sensor to objects within the field of view of the image sensor. After estimating depths within each new field of view, the processor translates depth estimates into coordinates corresponding to the observed coordinate system of the hospital bed and identifies them as perimeter, thereby expanding the discovered perimeters and internal areas with each new set of depth estimates. As the internal area within which the hospital bed operates expands, new perimeters and internal areas of the environment are discovered. The hospital bed continues to operate within the continuously expanding internal area while the image sensor acquires data and the processor estimates depths and translates them into coordinates corresponding to the observed coordinate system of the hospital bed, identifying them as perimeter of the environment until at least a portion of the perimeter of the environment is identified.

In some embodiments, prior to measuring vectors from the image sensor to objects within each new field of view, estimating depths, and translating them into coordinates, the processor adjusts previous coordinates to account for the measured movement of the hospital bed as it moves from observing one field of view to the next (e.g., differing from one another due to a difference in image sensor pose). This adjustment accounts for the movement of the coordinate system observed by the image sensor of the hospital bed with respect to a stationary coordinate system that may or may not coincide with the first field of view of the image sensor. In instances wherein the image sensor and hospital bed move as a single unit, the observed coordinate system of the image sensor, within which coordinates are identified as perimeter, moves with respect to the stationary coordinate system as the hospital bed moves. In some embodiments, a movement measuring device such as an odometer, gyroscope, optical flow sensor, optical encoder, etc. measures the movement of the hospital bed and hence the image sensor (assuming the two move as a single unit) as the image sensor moves to observe new fields of view with corresponding new observed coordinate systems. In some embodiments, the processor stores the movement data in a movement vector and transforms all perimeter coordinates to correspond to, for example, the initial coordinate system observed by the image sensor coinciding with the stationary coordinate system. For example, in an embodiment where C is a stationary Cartesian coordinate system, C0 may be the observed coordinate system of an image sensor fixed to a hospital bed at time t0 with state S and coinciding with stationary coordinate system C. The hospital bed with attached image sensor displaces and the image sensor observes coordinate system C1 at time t1 with state S'. A movement measuring device measures the movement vector V with values (x, y, theta) and the processor uses the movement vector V to transform coordinates observed in coordinate system C1 to corresponding coordinates in coordinate system C0, coinciding with static coordinate system C. The movement vector V allows all coordinates corresponding to different coordinate systems to be transformed to a single coordinate system, such as the static coordinate system C, thereby allowing the entire perimeter to correspond to a single coordinate system. Some embodiments of the present techniques reduce a non-trivial problem to simple addition of vectors.

In some embodiments, the hospital bed may have more than one movement measuring device in order to measure movement between each time step or fields of view observed. For example, the hospital bed may have gyroscopes and odometers that simultaneously provide redundant information. In many implementations, only one set of information is used by the processor of the hospital bed while the other is discarded. In other implementations, the processor combines the two readings by, for example, using a moving average (or some other measure of central tendency may be applied, like a median or mode) or a more complex method. Due to measurement noise, the type of measurement device used, etc. discrepancies between the measurements by a first device and a second device may exist and may not be the exact same. In such cases, the processor calculates movement of the hospital bed by combining the measurements from the first and second device, or selects measurements from one device as more accurate than the others. For example, the processor may combine measurements from the first device and the second device (or measurements from more devices, like more than three, more than five, or more than 10) using a moving average (or some other measure of central tendency may be applied, like a median or mode). The processor may also use minimum sum of errors to adjust and calculate movement of the hospital bed to compensate for the lack of precision between the measurements from the first and second device. By way of further example, the processor may use minimum mean squared error to provide a more precise estimate of the movement of the hospital bed. The processor may also use other mathematical methods to further process measured movement of the hospital bed by the first and second device, such as split and merge algorithm, incremental algorithm, Hough Transform, line regression, Random Sample Consensus, Expectation-Maximization algorithm, or curve fitting, for example, to estimate more realistic movement of the hospital bed. In another embodiment, the processor may use the k-nearest neighbors algorithm where each movement measurement is calculated as the average of its k-nearest neighbors.

In some embodiments, the processor fixes a first set of readings from, for example, a gyroscope and uses the readings as a reference while transforming a second set of corresponding readings from, for example, an odometer to match the fixed reference. In one embodiment, the processor combines the transformed set of readings with the fixed reference and uses the combined readings as the new fixed reference. In another embodiment, the processor only uses the previous set of readings as the fixed reference. In some embodiments, the processor iteratively revises the initial estimation of a transformation function to align new readings to the fixed reference to produce minimized distances from the new readings to the fixed reference. The transformation function may be the sum of squared differences between matched pairs between new readings and the fixed reference. For example, in some embodiments, for each value in the new readings, the processor finds the closest value among the readings in the fixed reference. The processor uses a point to point distance metric minimization technique such that each value in the new readings is aligned with its best match found in the fixed reference. In some embodiments, the processor uses a point to point distance metric minimization technique that estimates the combination of rotation and translation using a root mean square. The processor repeats the process to transform the values of new readings to the fixed reference using the obtained information. In using this mathematical approach, the accuracy of the estimated movement of the hospital bed is improved, subsequently improving the accuracy of the movement vector used in relating all coordinates to one another and in forming the perimeter of the place.

In some embodiments, the processor uses overlapping coordinates to verify the accuracy of the identified perimeter. Assuming the frame rate of the image sensor is fast enough to capture more than one frame of data in the time it takes the hospital bed to rotate the width of the frame, a portion of data captured within each field of view will overlap with a portion of data captured within the preceding field of view. In embodiments, the processor verifies accuracy of perimeter coordinates by assigning a vote (although other point systems can be used, such as providing a reward or assigning an arbitrary numerical value or symbol) to each coordinate identified as perimeter each time a depth estimated from data captured in a separate field of view translates to the same coordinate, thereby overlapping with it. In one embodiment, coordinates with increased number votes are considered to be more accurate. Multiple number of votes arise from multiple sets of data overlapping with one another and increase the accuracy in the predicted perimeter. In some embodiments, the processor ignores coordinates with a number of votes below a specified threshold.

In another embodiment, the processor uses overlapping depth estimates (or data from which depth is inferred) to verify the accuracy of the identified perimeter. In embodiments, the processor verifies accuracy of the predicted perimeter based on the number of overlapping depth estimates wherein increased number of overlapping depth estimates indicates higher accuracy in the predicted perimeter. In embodiments, the processor identifies overlapping depth estimates from two separate fields of view when a number of consecutive (e.g., adjacent) depth estimates from the first and second fields of view are equal or close in value. Although the value of overlapping estimated depths from the first and second fields of view may not be exactly the same, depths with similar values, to within a tolerance range of one another, can be identified (e.g., determined to correspond based on similarity of the values). Furthermore, the processor may identify matching patterns in the value of estimated depths within the first and second fields of view to identify overlapping depths. For example, a sudden increase then decrease in the depth values observed in both sets of estimated depths may be used to identify overlap. Examples include applying an edge detection algorithm (like Haar or Canny) to the fields of view and aligning edges in the resulting transformed outputs. Other patterns, such as increasing values followed by constant values or constant values followed by decreasing values or any other pattern in the values of the depths, can also be used to identify overlap between the two sets of estimated depths. A Jacobian and Hessian matrix can be used to identify such similarities. In some embodiments, the processor uses a metric, such as the Szymkiewicz-Simpson coefficient, to indicate how good of an overlap there is between two sets of estimated depths. In some embodiments, the processor uses thresholding in identifying an area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. Or in some embodiments, the processor determines an overlap with a convolution. Some embodiments may implement a kernel function that determines an aggregate measure of differences (e.g., a root mean square value) between some or all of a collection of adjacent depth readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied. In some embodiments, the processor generates a map of the environment by combining overlapping readings from different fields of view to generate the map, as described further in U.S. patent application Ser. Nos. 16/048,179, 16/048,185, and 62/669,509, the entire contents of which are hereby incorporated by reference.

In some instances, the processor uses the number of overlapping depth measurements from two separate fields of view to verify the angular rotation measured by a movement measuring device, such as a gyroscope, given that the angular increment between readings is known. Angular increments or angular resolution between readings may vary and may include, for example, 1 reading/degree, 1 reading/0.25 degrees, etc. The processor identifies overlapping depth measurements using the methods described above.

In some embodiments, there can be inconsistency between vector measurements from a first and second field of view, and hence estimated depths, to the same object in the place due to noise, such as measurement noise, and inaccuracy of calculation. This can result in adjacent coordinates representing the same perimeter of the place or the adjacent perimeter coordinates being staggered with some coordinates being closer to the center of the place than others. In one embodiment, the processor uses a conservative approach wherein the coordinates closer to the center of the place are chosen as the perimeter of the place. In another embodiment, the processor chooses the coordinates with greater number of votes (or assigned points or rewards, etc.) as the perimeter of the place. In yet another embodiment, the processor combines two or more sets of estimated depths to the same object(s) within the place to estimate new depths to the object. The processor identifies two or more sets of depth estimates as being estimated depths to the same object(s) within the place by identifying overlapping depth estimates from the two or more sets of depth estimates. In embodiments, the processor identifies overlapping depth estimates from two or more sets of depth estimates using methods such as those described above for identifying overlapping depth values from two sets of data. In embodiments, the processor combines two (or more) sets of overlapping depth estimates (or vector measurements or perimeter coordinates) using a moving average (or some other measure of central tendency may be applied, like a median or mode) and adopts them as the new depths for the area of overlap. The processor may also use minimum sum of errors to adjust and calculate depths to compensate for the lack of precision between overlapping depth estimates from the first and second fields of view. By way of further example, the processor may use minimum mean squared error to provide a more precise estimate of overlapping depths. The processor may also use other mathematical methods to further process overlapping depths, such as split and merge algorithm, incremental algorithm, Hough Transform, line regression, Random Sample Consensus, Expectation-Maximization algorithm, or curve fitting, for example. In another embodiment, the processor may use the k-nearest neighbors algorithm where each new depth is calculated as the average of the depth values of its k-nearest neighbors. These algorithms may be used alone or in combination. Multiple sets of overlapping depth estimates and their combination gives the hospital bed a greater chance of staying within the perimeter of the place and avoiding contact with the perimeter.

In another embodiment, a weight is assigned to each estimated depth. The value of the weight is determined based on various factors, such as quality of the reading, the degree of similarity between depths estimated from vectors measured in separate fields of view, the weight of neighboring depths, or the number of neighboring depths with high weight. In some embodiments, depths with weights less than an amount (such as a predetermined or dynamically determined threshold amount) are ignored, as depths with higher weight are considered to be more accurate. In some embodiments, increased weight is given to overlapping depths with a greater number of overlapping depth estimates between the overlapping sets of depths. In some embodiments, the weight assigned to readings is proportional to the number of overlapping depth estimates between the overlapping sets of depths. For example, data points corresponding to a moving object captured in one or two frames overlapping with several other frames captured without the moving object are assigned a low weight as they likely do not fall within the adjustment range and are not consistent with data points collected in other overlapping frames and would likely be rejected for having low assigned weight.

In some embodiments, more than two consecutive fields of view overlap, resulting in more than two sets of estimated depths overlapping. This may happen when the amount of angular movement between consecutive fields of view is small, especially if the frame rate of the camera is fast such that several frames within which vector measurements are taken are captured while the hospital bed makes small movements, or when the field of view of the camera is large or when the hospital bed has slow angular speed and the frame rate of the camera is fast. Higher weight may be given to estimated depths overlapping with more than two sets of estimated depths, as increased number of overlapping sets of depths provide a more accurate ground truth. In some embodiments, the amount of weight assigned to estimated depths is proportional to the number of depths from other sets of data overlapping with it. Some embodiments may merge overlapping depths and establish a new set of depths for the overlapping depth estimates with a more accurate ground truth. The mathematical method used can be a moving average or a more complex method.

Some embodiments may implement DB-SCAN on estimated depths and related values like pixel intensity, e.g., in a vector space that includes both depths and pixel intensities corresponding to those depths, to determine a plurality of clusters, each corresponding to estimated depth to the same feature of an object. Some embodiments may execute a density-based clustering algorithm, like DB-SCAN, to establish groups corresponding to the resulting clusters and exclude outliers. To cluster according to depth vectors and related values like intensity, in some embodiments, the processor of the hospital bed may iterate through each of the depth vectors and designate a depth vector as a core depth vector if at least a threshold number of the other depth vectors are within a threshold distance in the vector space (which may be higher than three dimensional in cases where pixel intensity is included). Some embodiments may then iterate through each of the core depth vectors and create a graph of reachable depth vectors. In such embodiments, nodes on the graph are identified in response to non-core corresponding depth vectors within a threshold distance of a core depth vector on the graph and in response to core depth vectors on the graph being reachable by other core depth vectors on the graph. Two depth vectors may be reachable from one another if there is a path from one depth vector to the other depth vector, where every link and the path is a core depth vector and within a threshold distance of one another. The set of nodes in each resulting graph, in some embodiments, may be designated as a cluster, and points excluded from the graphs may be designated as outliers that do not correspond to clusters. In some embodiments, the processor may then determine the centroid of each cluster in the spatial dimensions of an output depth vector for constructing perimeter maps. In some cases, all neighbors have equal weight and in other cases the weight of each neighbor depends on its distance from the depth considered and/or similarity of pixel intensity values.

In some instances, the processor uses a modified RANSAC approach on two or more sets of depth data or two or more sets of movement data or other type of data. The processor connects any two points, one from each data set, by a line. A boundary is defined with respect to either side of the line. Any points from either data set beyond the boundary are considered outliers and are excluded. The process is repeated using another two points. In some embodiments, the process removes outliers to achieve a higher probability of being true. For example, in an extreme case depth to objects is measured and a moving object is captured in two frames overlapping with several frames captured without the moving object. The approach described or RANSAC method may be used to reject data points corresponding to the moving object. This method or a RANSAC method may be used independently or in combination with other processing methods.

In some embodiments, the processor uses captured sensor data of objects, such as walls or furniture, within the surrounding environment to update the location of the hospital bed within the map such that the processor is aware of the position of the hospital bed relative to perimeters and objects within the environment as it operates. As the hospital bed moves within the environment and sensors capture data, the processor tracks the position of the hospital bed relative to observed objects within the environment by associating newly captured data of objects with previously captured data of objects. Prior to associating newly captured sensor data of objects with previously captured sensor data of objects, the processor updates the estimated position of previously captured objects relative to the hospital bed based on the most recent state of the objects and the motion model of the hospital bed. In some embodiments, the processor associates new sensor data with previously captured sensor data of different objects within the environment by defining acceptance gates around current estimated positions of previously captured objects. The newly captured sensor data that falls within an acceptance gate of an object and is closest to the updated estimated position of the object is associated with the corresponding previously captured sensor data of the object. However, over time, as the hospital bed moves around the environment and observes more objects and collects more sensor data, determining to which previously captured object newly captured sensor data is associated to becomes increasingly challenging. In such instances, the processor uses a probabilistic data association filter (PDAF) to associate newly captured sensor data with previously captured sensor data of observed objects within the environment. The PDAF considers all sensor data falling within the acceptance gate, wherein instead of updating the position of an object based on a single best matched observation, the PDAF updates based on all observations falling within the gating window, weighted by their likelihoods. In some embodiments, the PDAF accounts for the statistical distribution of sensor data errors and clutter and assumes that only one of the candidate observations within the gating window is a match, and the rest are false alarms. In other embodiments, the processor uses other methods for tracking the location of the hospital bed within the map of the environment during mapping and/or operation. For example, in one embodiment the processor uses scan matching techniques wherein the optimization algorithms, such as Gauss-Newton or Levenberg-Marquardt, are used to find the best match between scans by minimizing the error between the data of the scans.

In some embodiments, maps may be three dimensional maps, e.g., indicating the position of walls, furniture, doors, and the like in a room being mapped. In some embodiments, maps may be two dimensional maps, e.g., point clouds or polygons or finite ordered list indicating obstructions at a given height (or range of height, for instance from zero to 5 or 10 centimeters or less) above the floor. Two dimensional maps may be generated from two dimensional data or from three dimensional data where data at a given height above the floor is used and data pertaining to higher features are discarded. Maps may be encoded in vector graphic formats, bitmap formats, or other formats.

In some embodiments, the processor may, for example, use the map to autonomously navigate the environment during operation, e.g., accessing the map to determine that a candidate route is blocked by an obstacle denoted in the map, to select a route with a route-finding algorithm from a current point to a target point, or the like. In some embodiments, the map is stored in memory for future use. Storage of the map may be in temporary memory such that a stored map is only available during an operational session or in more permanent forms of memory such that the map is available at the next session or startup. In some embodiments, the map is further processed to identify rooms and other segments. In some embodiments, a new map is constructed at each use, or an extant map is updated based on newly acquired data.

FIG. 1 illustrates a flowchart describing embodiments of an example of a method for creating a map of an environment. In a first step 100, an image sensor is used to measure vectors to objects within the environment. In a second step 101, a processor calculates L2 norms of the measured vectors to get estimated depths to the objects. In a third step 102, the processor translates estimated depths to coordinates within the current coordinate system of the image sensor. In a fourth step 103, the processor transforms the coordinates within the current coordinate system into coordinates within a common coordinate system using measured movement between frames captured by the image sensor, wherein each frame corresponds to a different coordinate system. In a fifth step 104, the transformed coordinates are marked as perimeter in the common coordinate system to create a map of the environment. In a sixth step 105, the process is repeated as the image sensor moves and measures new vectors to objects within the place.

In some embodiments, the map of the environment is generated using other methods. Examples of other mapping methods are described in U.S. patent application Ser. Nos. 16/163,541, 16/163,562, 16/163,508, 16/185,000, and 62/681,965, the entire contents of which are hereby incorporated by reference. In some embodiments, two or more autonomous hospital beds collaborate to generate a map of the environment, such that a processor of an autonomous hospital bed is capable of seeing beyond areas of the environment that it has discovered itself. This can be particularly important in large environments, such as a hospital. Methods for collaboratively creating a map of an environment are described in U.S. patent application Ser. Nos. 16/185,000 and 15/981,643, the entire contents of which are hereby incorporate by reference. For example, a depth measurement device of a first hospital bed takes depth readings within a 360-degree field of view of a two-dimensional plane. At the same time, depth measurement devices of other hospital bed operating within the same environment take depth readings within their respective fields of view. A processor of each hospital bed shares depth readings taken by their respective depth measurement device with all or a select group of other hospital bed operating within the same environment with whom a wireless data transfer channel (DTC) is established. Processors of hospital beds can form, strengthen, or end DTCs with one another based on the usefulness of the relationship with the connected hospital bed. Using Hebbian learning, a weight is assigned to each DTC based on a reward received as a result of collaboration between processors of hospital beds. Based on the outcome of collaboration (e.g., magnitude of reward), processors of hospital beds may strengthen, weaken, or end a DTC. If the readings from another processor of a hospital bed are useful to the processor of the hospital receiving the information, then the processor increases the strength of the link and the confidence level in information received from the remote source. If the readings from the processor of another hospital bed are useless to the receiving processor, the processor decreases the strength of DTC link and, if repeatedly useless, the processor eventually discards the readings received from the processor of the particular hospital bed. The processor of each hospital bed adjusts data received from another processor of a hospital bed based on its location and the location of the other hospital bed with respect to the environment. To form a larger field of view, the processor of each hospital bed stores its own sensor readings and uses them to create a larger field of view map by combining overlapping readings taken within separate fields of view, using overlapping readings as attachment points. When the processor of each hospital bed receives new readings from another processor, it stores those readings and checks if the received readings overlap with readings in its own map (which may include depth readings taken from different depth measurement devices). When checking for overlap, each processor considers multiple variations of combinations, each having different overlap, in order to filter through the data, determine if and where there is overlap, and if so, the combination which results in readings with the highest confidence level. The processor implements the combination with highest confidence level into its map of the environment and stores the remaining readings for future combinations. The confidence level of readings increases with increasing number of sets of overlapping readings and decreases with motion, therefore the confidence level of readings within the map continuously fluctuate. Each processor constructs an extended map of the environment by combining readings collected locally and remotely by sensors of various hospital beds positioned at different locations throughout the environment, allowing each collaborating hospital bed to see beyond the surroundings it has discovered itself.

In some embodiments, the processor determines a movement path using a path planning method that is responsive to stimulus from an observed environment. Some embodiments segment a working environment into regions and then dynamically adjust a movement path within each of those regions based on sensed attributes of the environment. In some embodiments, a topological graph represents the route plan of the hospital bed and is described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the hospital bed as it follows along edges linked at vertices. While executing the movement path, in some embodiments, rewards may be assigned as the hospital bed takes actions to transition between states and uses the net cumulative reward to evaluate a particular movement path comprised of actions and states. A state-action value function may be iteratively calculated during execution of the movement path based on the current reward and maximum future reward at the next state. One goal is to find optimal state-action value function and optimal policy by identifying the highest valued action for each state. As different topological graphs including vertices and edges with different properties are executed over time, the number of states experienced, actions taken from each state, and transitions increase. The path devised by the processor of the hospital bed iteratively evolves to become more efficient by choosing transitions that result in most favorable outcomes and by avoiding situations that previously resulted in low net reward. After convergence, the evolved movement path is determined to be more efficient than alternate paths (e.g., between point A and B) that may be devised using real-time sensory input of the working environment.

In embodiments, the properties of the vertices and edges of the topological graph describing the movement path of the hospital bed may be provided at run-time as an argument based on sensory input. A property of a vertex may be, for example, its position and the number and position of vertices linked via edges. A property of an edge may be, for example, edge type such as a line or arc, edge length or radius depending on edge type, angular orientation and connecting vertices. In some embodiments, vertices and edges may also include other properties such as floor type, room identifier and/or level of activity. In embodiments, the topological graph may be implemented within a taxicab coordinate system, where the path is limited to following along the grid lines of the taxicab coordinate system, thereby limiting edge type to a line. In other embodiments, the number of roots or nodes of the topological graph is limited to one.

In embodiments, the processor begins to collect sensory input of the environment and create a map of the environment by stitching newly collected readings with previously collected readings. As the processor receives sensory input, in some embodiments, it creates a representation of the map in a taxicab coordinate system and begins to devise a topological path within discovered areas, i.e. areas for which sensory input has been collected, the edges of the path being lines following along the gridlines of the taxicab coordinate system. Sensory input may be, for example, a collection of depth measurements. The devised topological path may be based on estimates of suitable properties for vertices and edges based on sensory input received. The next action or movement of the hospital bed may be along a path defined by the estimated properties of the vertices and edges. As the hospital bed executes the action, it transitions from its current state to a new state. After completing each action and transitioning to a new state, in embodiments, a reward may be assigned and a state-action value function may be iteratively calculated based on the current reward and the maximum future reward at the next state. In some embodiments, e.g., where time is not considered discrete, the value of the reward may be dependent on sequential time required to complete the action and transition to the new state, where a greater negative reward is assigned for longer times. As such, in some embodiments, the hospital bed incurs a negative reward at all times. Since the hospital bed is penalized for time, any event that may reduce the efficiency of the hospital bed in terms of overall time to complete a task increases its overall penalty. These events may include collisions with obstacles, number of U-turns, and entering areas with high activity level. In embodiments, these events may be directly used to assign negative reward thereby acting as optimization factors themselves. In embodiments, other efficiency metrics may be used. Once the hospital bed completes its task and hence the topological movement path required to complete the task, a positive reward value (e.g., predetermined or dynamically determined) may be assigned. A net reward value for the executed movement path, consisting of a sequence of states and actions, may then be calculated as the sum of the cumulative negative reward from the multiple actions taken while transitioning from one state to another and the positive reward upon completion of the task.

As multiple work sessions are executed over time, in embodiments, optimal state-action value function and optimal policy from which actions from different states are selected may be determined. From a single state, there may be several actions that can be executed. The sequence of states and actions that result in the maximum net reward, in some embodiments, provides the optimal state-action value function for a particular task (e.g., transportation of the hospital bed from point A to point B). The action from a state which results in the highest reward provides the optimal policy for the given state. As different movement paths are executed over time, the number of states experienced, actions taken from each state, and transitions increase.

In some embodiments, for a particular task for example, the processor devises a path for the hospital bed iteratively over multiple work sessions, evolving to become more efficient by choosing transitions that result in most favorable outcomes and by avoiding situations that previously resulted in low net reward. In embodiments, properties for each movement path are selected within an assigned work cycle such that the cumulative penalty value for consecutive work cycles have a lowering trend over time. In some embodiments, convergence to a particular movement path may be executed by the processor when the reward is maximized or a target reward is achieved or a period of time has passed after which the processor may converge the movement path to the path with highest reward. After convergence, assuming the system did not fall into a local minimum or is able to get out of a local minimum, the evolved movement path may be deemed by the processor to likely be more efficient than alternate paths that may possibly be devised using real-time sensory input of the working environment. In some embodiments, the processor may avoid falling into a local minimum using techniques such as random restarts, simulated annealing and tabu search. For example, in employing random restarts technique, the processor may randomly restart the process of searching for a candidate solution starting at a new random candidate after a certain amount of time, while still saving in memory previous candidate solutions. In embodiments wherein simulated annealing technique is used, the processor replaces a current candidate solution when a better solution is found but may also probabilistically replace the current candidate solution with a worse solution. In embodiments using tabu search technique, the processor refuses to return back to recently considered candidate solutions until they are sufficiently in the past. This is expected to provide a more reliable and efficient method to devise path plans as movements are evaluated and optimized in real-time, such that the most efficient movements are eventually executed and factors reducing efficiency are reduced with the fine-tuning of properties over time.

The next action or movement of the hospital bed is along the path defined by the estimated properties of the vertices and edges chosen based on real-time sensory input. As the hospital bed executes the action, it transitions from its current state to a new state and movement from one state to the next is defined by a discrete time slot. This may be represented by a Markov Chain comprised of a sequence of random variables $s_1, s_2, s_3, \ldots$. The random variables are states the hospital bed may experience and form a set S called the state space. The topological graph defining the movement path of the hospital bed may therefore be thought of as a sequence of states $s \in S$, where states are connected by paths and are each defined with a discrete time stamp $t \in T$. For the hospital bed to transition from a current state s to next state s', the hospital bed performs an action $a \in A$ over a time span of t to t', displacing a distance d along an edge of the topological graph. When the state space is defined by a taxicab coordinate system, the distance d is given by the rectilinear distance or L1 norm and displacement is along a line. For a Markov chain, having Markov property, the probability of moving to a next state is dependent only on the present state. This is mathematically represented by $P(s'|s)$. A Markov chain may, therefore, be represented by a topological graph, where the edges of graph t are labelled by the probabilities of transitioning from one state at time t to another at time t'. A Markov chain may be further extended to a Markov Decision Process (MDP) through the addition of actions (choices) and rewards (motivation), such that there are multiple actions that may be chosen from a single state and a different reward associated with each action. MDP is a five-tuple comprising a finite set of states S, a finite set of actions A, the probability that action a will lead to state s' at time t' given by $P(s'|s)$, the immediate reward after transitioning from state s to state s' given by r, and the discount factor $\gamma$, representing the difference in importance between future and present rewards. The goal of MDP is to find an optimal policy function $\pi$ that specifies the highest rewarded action a to take for each state s. For a MDP, after completing each action and transitioning to a new state, a reward is assigned and a state-action value function is iteratively calculated as the expected value of the current reward plus the discounted maximum future reward at the next state. The state-action value function provides the value of a state. The processor does not require any visualization in choosing the next action of the hospital bed, it only involves, in some embodiments, optimization of the state-action value function. In optimizing the state-action value function, the highest rewarded actions from each state are concurrently (e.g., simultaneously) identified and used in deriving the optimal policy. In embodiments, where the time is not considered discrete, the value of the reward may be dependent on sequential time required to complete the action and transition to a new state, where a greater negative reward is assigned for longer times. In such a case, the hospital bed is always incurring negative reward and actions having smaller negative reward are considered superior. (Of course, the selection of sign is arbitrary, and embodiments may also implement the reverse arrangement, which is not to suggest that any other description is limiting.) Events that increase the time required to complete an action and transition to the next state may therefore indirectly increase the amount of negative reward incurred. Other optimization factors may also assign negative reward, including but not limited to, collisions with obstacles, number of U-turns, or activity level of rooms. Once the hospital bed completes its task (e.g., transportation of a patient from room A to room B), and hence the movement path required to complete the task, a predetermined positive reward value is assigned. A net reward value for the executed movement path, consisting of a sequence of states and actions, is then calculated as the sum of the cumulative negative reward from the multiple actions taken while transitioning from one state to another and the positive reward upon completion of the task.

Over time, the goal is to find optimal state-action value function and optimal policy from which actions from different states are selected. For a single state, there may be several actions that can be executed. The sequence of states and actions that result in the maximum net reward provide the optimal state-action value function for a given state. The action for a given state that results in maximum reward provides the optimal policy for the given state. An optimal policy for a state space may then contain the highest valued action corresponding to multiple states. As different movement paths are executed over time, the number of states experienced, actions taken from each state, and transitions increase. The path devised by the processor may iteratively evolve to become more efficient by choosing transitions that result in most favorable outcomes and by avoiding situations which previously resulted in low net reward. After convergence, assuming the system did not fall into a local minimum or is able to get out of a local minimum, the evolved movement path is trusted to be more efficient than alternate paths which may be devised using real-time sensory input of the working environment.

The Markov Decision Process (MDP) consisting of a sequence of states and actions followed by rewards is mathematically notated below. Actions are taken to transition from one state to another and after transitioning to each new state a reward is assigned. For a sequence of states and actions, the net reward is the sum of rewards received for the sequence of states and actions, with future rewards discounted. The expected net reward for the execution of a sequence of states and actions is given by a state-action value function. The goal is to find an optimal state-action value function by identifying sequence of states and actions with highest net reward. Since multiple actions can be taken from each state, the goal is to also find an optimal policy that indicates the action from each state with the highest reward value.

Consider a sequence of states s and actions a followed by rewards r $s_t$, $a_t$, $r_{t+1}$, $s_{t+1}$, $a_{t+1}$, $r_{t+2}$, $s_{t+2}$, $a_{t+2}$, $r_{t+3}$, . . . $a_T$, $r_T$, $s_T$. The net return $R_T$ to be expected in the future is the sum of the rewards received for the sequence of states and actions beginning from state $s_t$ and ending with terminal state $s_T$. This is mathematically represented by: $R_T=r_{t+1}+\gamma^1 r_{t+2}+ \ldots +\gamma^{T-t-1} r_T$, where $0\leq\gamma<1$ is a discount factor applied as distant rewards are less important. The value of a state-action pair $Q(s, a)=E[R_T|s_t=s, a_t=a]$ is defined as equivalent to the expected return $R_T$ for the sequence of states and actions beginning with state $s_t$ and action $a_t$ and ending with terminal state $s_T$. By finding the sequence of states and actions which maximize the state-action value function Q(s, a), the optimal value function $Q^*(s, a)=\max E[R_T|s_t=s, a_t=a]$ is identified. And the optimal policy $\pi^*(s)=\operatorname{argmax} Q^*(s, a)$ for each state can be derived by identifying the highest valued action which can be taken from each state.

To iteratively calculate the state-action value function for a given state s and action a, the Bellman Optimality equation may be applied. The optimal value function obeys Bellman Optimality equation and can be expressed a $Q^*(s, a)=E[r+\gamma \max Q^*(s', a')]$. The equation expresses that the value for a given state s and action a should represent the current reward r observed at state s plus the maximum discounted $\gamma$ future reward for the next state s' the hospital bed would end up in. This equation can be used to iteratively calculate the state-action value $Q_{i+1}(s, a)=E[r+\gamma \max Q_i(s', a')]$ for a given state s and action a as the sequence of states and action are executed. i is the iteration number and begins at i=0, with $Q_0(s', a')$ being initially assumed based, for example, on previous experience, the midpoint of the min and max value possible, or an arbitrary value. Based on the definition of an expected value, the equation is equivalent to $Q_{i+1}(s, a)=\Sigma P(s'|s)[r+\gamma \max Q_i(s', a')]$, where P(s'|s) is the probability that action a will lead to state s', as previously described above. In embodiments, the sequence of states and actions corresponds to the states visited and actions taken while executing the movement path from start to finish, where actions are defined by the properties of vertices and edges chosen based on sensory input. Over time, as more states are visited and different actions from each state are evaluated the system will converge to find the most optimal action to take from each state thereby forming an optimal policy. Further, as different sequences of states and actions, i.e. movement paths, are evaluated over time, the system will converge to the most optimal sequence of states and actions In some embodiments, a route plan is devised within discovered areas of the environment where it is not required that the entire working environment be mapped before devising a movement path. In some embodiments, observations of the environment continue while the hospital bed executes a movement path within discovered areas, resulting in newly discovered areas and a more defined perceived environment. In embodiments, the hospital bed executing a movement path based on the perceived environment and discovery of new areas alternate. For example, the hospital bed may first be in discovery mode where observations of the environment are collected thereby discovering new areas. Following discovery mode, the hospital bed may then execute a movement path devised within the discovered areas based on the discovered areas perceived. In embodiments, the hospital bed concurrently (e.g., simultaneously) devises and executes a movement path based on the perceived environment and discovers new areas. For example, the processor may perceive an area surrounding its starting point and devise a movement path within the perceived area. While it executes the movement path, new areas are perceived for which a second movement path is devised. In embodiments, the movement path may be altered or amended as new areas are discovered and perceived. In other embodiments, a movement path is completed without alteration and a second movement path is devised within newly discovered areas.

Figure 2:
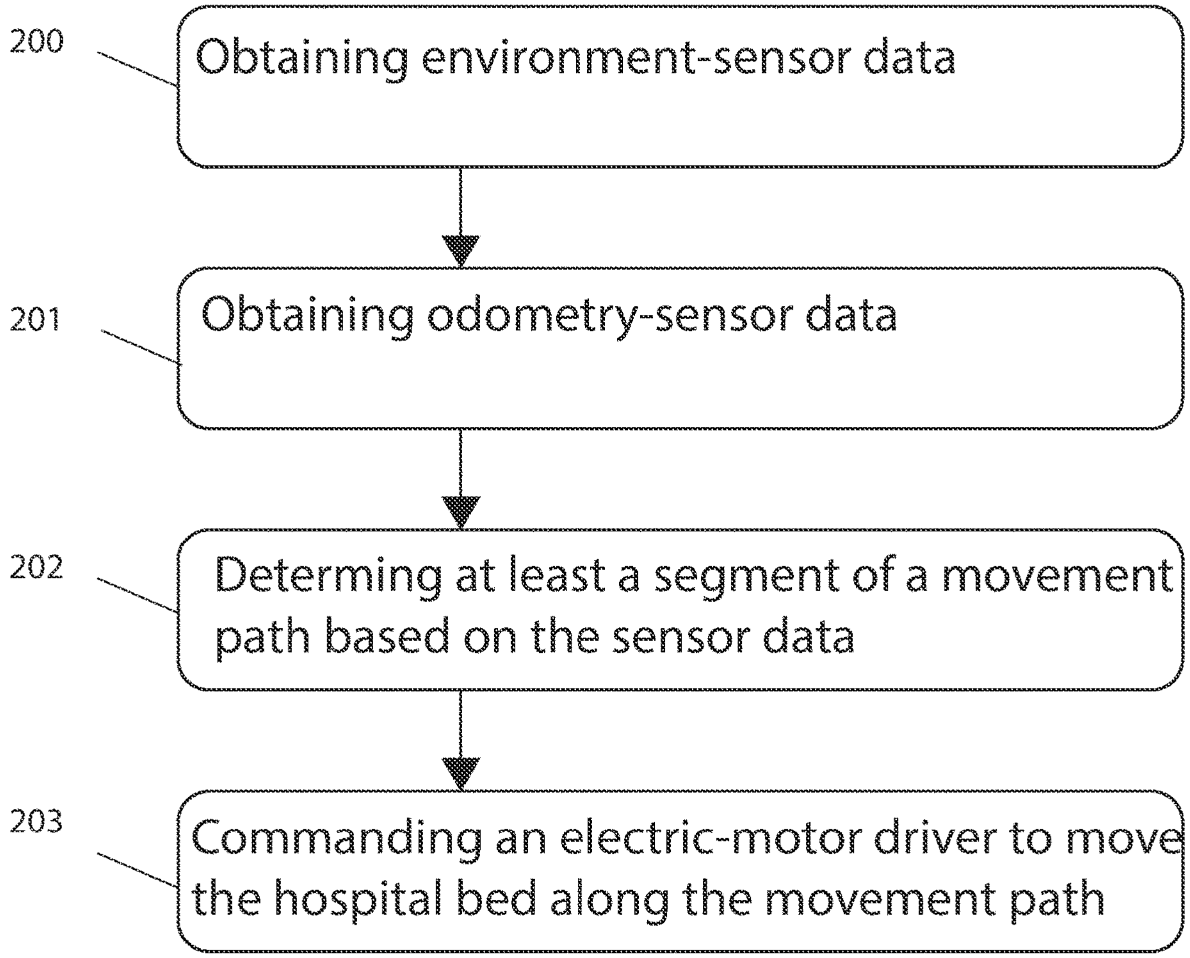
FIG. 2 illustrates a flowchart describing an example of a method for generating a movement path of an autonomous hospital bed, according to some embodiments.

FIG. 2 illustrates a flowchart describing an example of a path planning method of a hospital bed, wherein in a first step 200, a processor of the hospital bed obtains environment-sensor data, in a second step 201, the processor obtains odometry sensor data, in a third step 202, the processor determines at least a segment of a movement path (e.g., including a shape, a distance, and a direction of the segment), and in a fourth step, the processor instructs an electric-motor driver to move the hospital bed along the movement path.

In some embodiments, a graphical user interface (GUI) of an application, such as an application executed on a smartphone, computer, tablet, dedicated remote control, or any device that may display output data from the hospital bed and receive inputs from a user (e.g., hospital staff) may be used. A user may use the GUI of the application to view a location of the hospital bed, to provide commands to the processor of the hospital bed, check room temperature of the hospital bed, provide or modify a movement path from a first location to a second location to the processor of the hospital bed, view and modify a map of the environment, provide or modify hospital bed settings (e.g., bed height, bed inclination, and provide scheduled tasks. User inputs are sent from the GUI to the processor of the hospital bed for implementation. Data may be sent between the hospital bed and the user interface through one or more network communication connections. A variety of types of wireless network signals may be used, including, but not limited to, radio signals, Wi-Fi™ signals, or Bluetooth™ signals. An example of a GUI interface is described in U.S. patent application Ser. Nos. 15/272,752 and 15/949,708, the entire contents of which are hereby incorporated by reference. Examples of methods for providing scheduling information to an autonomous device are described in U.S. patent application Ser. Nos. 16/051,328 and 15/449,660, the entire contents of which are hereby incorporated by reference. For instance, some embodiments provide a method including: monitoring use times of a robotic device over a preset period of time; storing the times and dates the robotic device was turned on in a database; devising a suggested work schedule from the stored data using a machine learning technique; proposing the suggested work schedule to users through an input/output device; accepting user adjustments to the suggested work schedule through the input/output device; and adding the user adjustment data to the database for use in devising future work schedules. In some embodiments, the suggested work schedule is developed based on times the robotic device was turned on as per user-provided instruction. In some embodiments, the times the robotic device was turned on is stored in a database. In some embodiments, the suggested work schedule is followed by the robotic device after approval by the user of the suggested work schedule. In some embodiments, the suggested work schedule is developed based on data stored in the most recently updated database, wherein the database is continuously updated with new times the robotic-floor cleaning device was turned on. In some embodiments, the suggested work schedule is developed based on the times the robotic device was turned on that are stored in the database and using a start time that is the mean or median of the start times in the database, a start time that is the mean or median of a subset of the start times in the database, and/or using a machine learning algorithm to devise a work schedule based on the times in the database.

In some embodiments, the processor of the autonomous hospital bed localizes the hospital bed within the environment. In some embodiments, the processor determines a phase space probability distribution over all possible states of the hospital bed within the phase space using a statistical ensemble including a large collection of virtual, independent copies of the hospital in various states of the phase space. In some embodiments, the phase space consists of all possible values of position and momentum variables. In some embodiments, the processor represents the statistical ensemble by a phase space probability density function ρ(p, q, t), q and p denoting position and velocity vectors. In some embodiments, the processor uses the phase space probability density function ρ(p, q, t) to determine the probability ρ(p, q, t)dq dp that the hospital bed at time t will be found in the infinitesimal phase space volume dq dp. In some embodiments, the phase space probability density function ρρ(p, q, t) has the properties ρ(p, q, t)≥0 and ∫ρ(p, q, t)d(p, q)=1, ∀t≥0, and the probability of the position q lying within a position interval a, b is $P[a\le q\le b]=\int_a^b\int\rho(p, q, t)dpdq$. Similarly, the probability of the velocity p lying within a velocity interval c, d is $P[c\le q\le d]=\int_c^d\int\rho(p, q, t)dqdp$. In some embodiments, the processor determines values by integration over the phase space. For example, the processor determines the expectation value of the position q by $\langle q\rangle=\int q\,\rho(p, q, t)d(p, q)$.

In some embodiments, the processor evolves each state within the ensemble over time t according to an equation of motion. In some embodiments, the processor models the motion of the hospital bed using a Hamiltonian dynamical system with generalized coordinates q, p wherein dynamical properties are modeled by a Hamiltonian function H. In some embodiments, the function represents the total energy of the system. In some embodiments, the processor represents the time evolution of a single point in the phase space using Hamilton's equations $$\frac{dp}{dt}=-\frac{\partial H}{\partial q},\ \frac{dq}{dt}=\frac{\partial H}{\partial p}.$$

In some embodiments, the processor evolves the entire statistical ensemble of phase space density function ρ(p, q, t) under a Hamiltonian H using the Liouville equation $$\frac{\partial \rho}{\partial t}=-\{\rho, H\},$$

wherein {•, •} denotes the Poisson bracket and H is the Hamiltonian of the system. For two functions f, g on the phase space, the Poisson bracket is given by $$\{f, g\}=\sum_{i=1}^{N}\left(\frac{\partial f}{\partial q_i}\frac{\partial g}{\partial p_i}-\frac{\partial f}{\partial p_i}\frac{\partial g}{\partial q_i}\right).$$

In this approach, the processor evolves each possible state in the phase space over time instead of keeping the phase space density constant over time, which is particularly advantageous if sensor readings are sparse in time.

In some embodiments, the processor evolves the phase space probability density function $\rho(p, q, t)$ over time using the Fokker-Plank equation which describes the time evolution of a probability density function of a particle under drag and random forces. In comparison to the behavior of the autonomous hospital bed modeled by both the Hamiltonian and Liouville equations, which are purely deterministic, the Fokker-Planck equation includes stochastic behaviour. Given a stochastic process with $dX_t=\mu(X_t, t)dt+\sigma(X_t, t)dW_t$, wherein $X_t$ and $\mu(X_t, t)$ are M-dimensional vectors, $\sigma(X_t, t)$ is a M×P matrix, and $W_t$ is a P-dimensional standard Wiener process, the probability density $\rho(x, t)$ for $X_t$ satisfies the Fokker-Planck equation $$\frac{\partial \rho(x,t)}{\partial t} = -\sum_{i=1}^{M} \frac{\partial}{\partial x_i}[\mu_i(x,t)\rho(x,t)] + \sum_{i=1}^{M}\sum_{j=1}^{M} \frac{\partial^2}{\partial x_i \partial x_j}[D_{ij}(x,t)\rho(x,t)]$$

with drift vector $\mu=(\mu_1, \ldots, \mu_M)$ and diffusion tensor $$D = \frac{1}{2}\sigma\sigma^T.$$

In some embodiments, the processor adds stochastic forces to the motion of the hospital bed governed by the Hamiltonian H and the motion of the hospital bed is then given by the stochastic differential equation $$dX_t = \begin{pmatrix} dq \\ dp \end{pmatrix} = \begin{pmatrix} +\frac{\partial H}{\partial p} \\ -\frac{\partial H}{\partial q} \end{pmatrix} dt = \begin{pmatrix} 0_N \\ \sigma_N(p, q, t) \end{pmatrix} dW_t,$$

wherein $\sigma_N$ is a N×N matrix and $dW_t$ is a N-dimensional Wiener process. This leads to the Fokker-Plank equation $$\frac{\partial \rho}{\partial t} = -\{\rho, H\} + \nabla_p \cdot$$

$(D\nabla_p\rho)$, wherein $\nabla_p$ denotes the gradient with respect to position p, $\nabla\cdot$ denotes divergence, and $$D = \frac{1}{2}\sigma_N\sigma_N^T$$

is the diffusion tensor.

In other embodiments, the processor incorporates stochastic behaviour by modeling the dynamics of autonomous hospital bed using Langevin dynamics, which models friction forces and perturbation to the system, instead of Hamiltonian dynamics. The Langevian equations are given by $M\ddot{q}=-\nabla_q U(q)-\gamma p+\sqrt{2\gamma k_B T M}R(t)$, wherein $(-\gamma p)$ are friction forces, $R(t)$ are random forces with zero-mean and delta-correlated stationary Gaussian process, T is the temperature, $k_B$ is Boltzmann's constant, $\gamma$ is a damping constant, and M is a diagonal mass matrix. In some embodiments, the Langevin equation is reformulated as a Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

that the processor uses to evolve the phase space probability density function over time. In some embodiments, the second order term $\nabla_p\cdot(\gamma M\nabla_p\rho)$ is a model of classical Brownian motion, modeling a diffusion process. In some embodiments, partial differential equations for evolving the probability density function over time may be solved by the processor of the hospital bed using, for example, finite difference and/or finite element methods.

In some embodiments, the processor of the hospital bed may update the phase space probability distribution when the processor receives readings (or measurements or observations). Any type of reading that may be represented as a probability distribution that describes the likelihood of the state of the hospital bed being in a particular region of the phase space may be used. Readings may include measurements or observations acquired by sensors of the hospital bed or external devices such as a Wi-Fi™ camera. Each reading may provide partial information on the likely region of the state of the hospital bed within the phase space and/or may exclude the state of the hospital bed from being within some region of the phase space. For example, a depth sensor of the hospital bed may detect an obstacle in close proximity to the hospital bed. Based on this measurement and using a map of the phase space, the processor of the hospital bed may reduce the likelihood of the state of the hospital bed being any state of the phase space at a great distance from an obstacle. In another example, a reading of a floor sensor of the hospital bed and a floor map may be used by the processor of the hospital bed to adjust the likelihood of the state of the hospital bed being within the particular region of the phase space coinciding with the type of floor sensed. In an additional example, a measured Wi-Fi™ signal strength and a map of the expected Wi-Fi™ signal strength within the phase space may be used by the processor to adjust the phase space probability distribution. As a further example, a Wi-Fi™ camera may observe the absence of the hospital bed within a particular room. Based on this observation the processor may reduce the likelihood of the state of the hospital bed being any state of the phase space that places the hospital bed within the particular room.

In embodiments, the processor of the autonomous hospital bed may update the current phase space probability distribution $\rho(p, q, t_i)$ by re-weighting the phase space probability distribution with an observation probability distribution $m(p, q, t_i)$ according to $$\bar{\rho}(p, q, t_i) = \frac{\rho(p, q, t_i) \cdot m(p, q, t_i)}{\int \rho(p, q, t_i) m(p, q, t_i) d(p, q)}.$$

In some embodiments, the observation probability distribution may be determined by the processor for a reading at time $t_i$ using an inverse sensor model. In some embodiments, wherein the observation probability distribution does not incorporate the confidence or uncertainty of the reading taken, the processor may incorporate the uncertainty into the observation probability distribution by determining an updated observation probability distribution $$\hat{m} = \frac{1-\alpha}{c} + \alpha m$$

that may be used in re-weighting the current phase space probability distribution, wherein α is the confidence in the reading with a value of 0 ≤α≤1 and c=∫∫dpdq.

In some embodiments, the processor of the autonomous hospital bed may determine a probability density over all possible states of the hospital bed within a Hilbert space using a complex-valued wave function for a single-particle system $\Psi(\vec{r}, t)$, wherein $\vec{r}$ may be a vector of space coordinates. In some embodiments, the wave function $\Psi(\vec{r}, t)$ is proportional to the probability density that the particle will be found at a position $\vec{r}$, i.e. $\rho(\vec{r}, t)=|\Psi(\vec{r}, t)|^2$. In some embodiments, the processor normalizes the wave function such that the total probability of finding the particle, or in this case the hospital bed, somewhere adds up to unity $\int|\Psi(\vec{r}, t)|^2dr=1$ and the function $\rho(\vec{r}, t)$ becomes equal to the probability density. In some embodiments, the processor may apply a Fourier transform to the wave function $\Psi(\vec{r}, t)$ to yield wave function $\Phi(\vec{p}, t)$ in the momentum space, with associated momentum probability distribution $\sigma(\vec{p}, t)=\Phi|(\vec{p}, t)|^2$. In some embodiments, the processor may evolve the wave function over time using Schrödinger equation $i\hbar$ $$\frac{\partial}{\partial t}\Psi(\vec{r}, t) = \left[-\frac{\hbar^2}{2m}\nabla^2 + V(\vec{r})\right]\Psi(\vec{r}, t),$$

wherein the bracketed object is the Hamilton operator $$\hat{H} = -\frac{\hbar^2}{2m}\nabla^2 + V(\vec{r}),$$

i is the imaginary unit, $\hbar$ is the reduced Planck constant, $\nabla^2$ is the Laplacian, and $V(\vec{r})$ is the potential. For conservative systems (constant energy), the time-dependent factor can be separated from the wave function, giving the time-independent Schrodinger equation $$\left[-\frac{\hbar^2}{2m}\nabla^2 + V(\vec{r})\right]\Psi(\vec{r}) = E\Psi(\vec{r}),$$

or otherwise $\hat{H}\psi(\vec{r})=E\psi(\vec{r})$, the eigenvalue equation for the Hamiltonian operator. In some embodiments, the processor may solve the time-independent Schrodinger equation in terms of eigenfunctions $\psi_n$ with eigen-energy values $E_n$, wherein $\Psi(\vec{r}, t)=\Sigma_{c_n} c_n e^{-iE_nt/\hbar}\psi_n$ and $c_n=\int\Psi(\vec{r}, 0)\psi^*_n dr$.

In some embodiments, the processor of the autonomous hospital bed updates the probability density of the Hilbert space each time an observation or measurement is received. For each observation a with associated operator Â, the processor may perform eigen-decomposition $\hat{A}\omega_n=a_n\omega_n$, wherein the eigenvalue corresponds to the observed quantity. In some embodiments, wherein the operator has a finite spectrum or a single eigenvalue is observed, the processor may collapse to the eigenfunction(s) $\Psi(\vec{r}, t)\rightarrow\gamma\Sigma_{n=1}^{N}p(a_n)d_n\omega_n$, wherein $d_n=\int\omega^*_n\Psi dr$, p(a) is the probability of observing value a, and γ is a normalization constant. In some embodiments, wherein the operator has continuous spectrum, the summation may be replaced by an integral.

In some embodiments, wherein the state of the hospital bed within a space is initially unknown, the processor may generate a uniform probability distribution over the space. In other instances, any other probability distribution may be generated depending on the information known about the state of the hospital bed and the certainty of the information. Over time and as more measurements and observations are received by the processor, the probability distribution over all possible states of the hospital bed in the space evolves.

Figure 3:
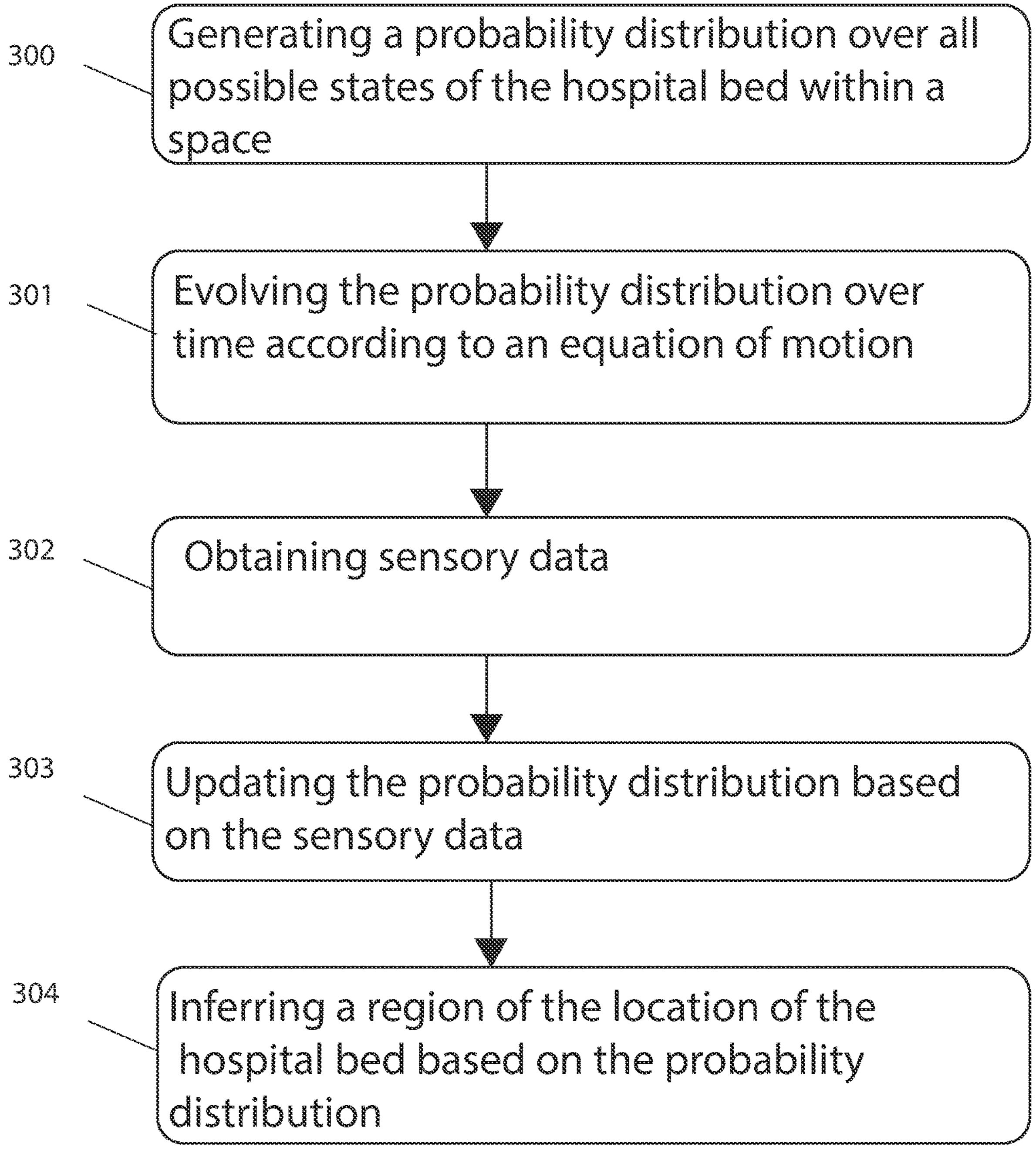
FIG. 3 illustrates a flowchart describing an example of a method for localizing a hospital bed within an environment, according to some embodiments.

FIG. 3 illustrates a flowchart describing an example of a method for localizing an autonomous hospital bed, wherein in a first step 300, a processor of the hospital bed generates a probability distribution over all possible states (e.g., all possible positions) of the hospital bed with a space (e.g., a phase space), in a second step 301, the processor evolves the probability distribution over time according to an equation of motion (e.g., Hamiltonian), in a third step 302, the processor obtains sensory data, in a fourth step 303, the processor updates the probability distribution based on the sensory data (e.g., depth data, object features, Wi-Fi signal strength, floor type, etc.), and in a fifth step 304, the processor infers a region within which the location of the hospital bed lies based on the probability distribution. In other embodiments, the processor may use other methods for localizing the hospital bed, such as those described in U.S. patent application Ser. Nos. 16/297,508, 62/740,573, 62/740,580, 15/955,480, 15/425,130, 15/955,344, 62/746,688, 62/665,095, 62/674,994, and 62/688,497, the entire contents of which are hereby incorporated by reference.

Figure 4:
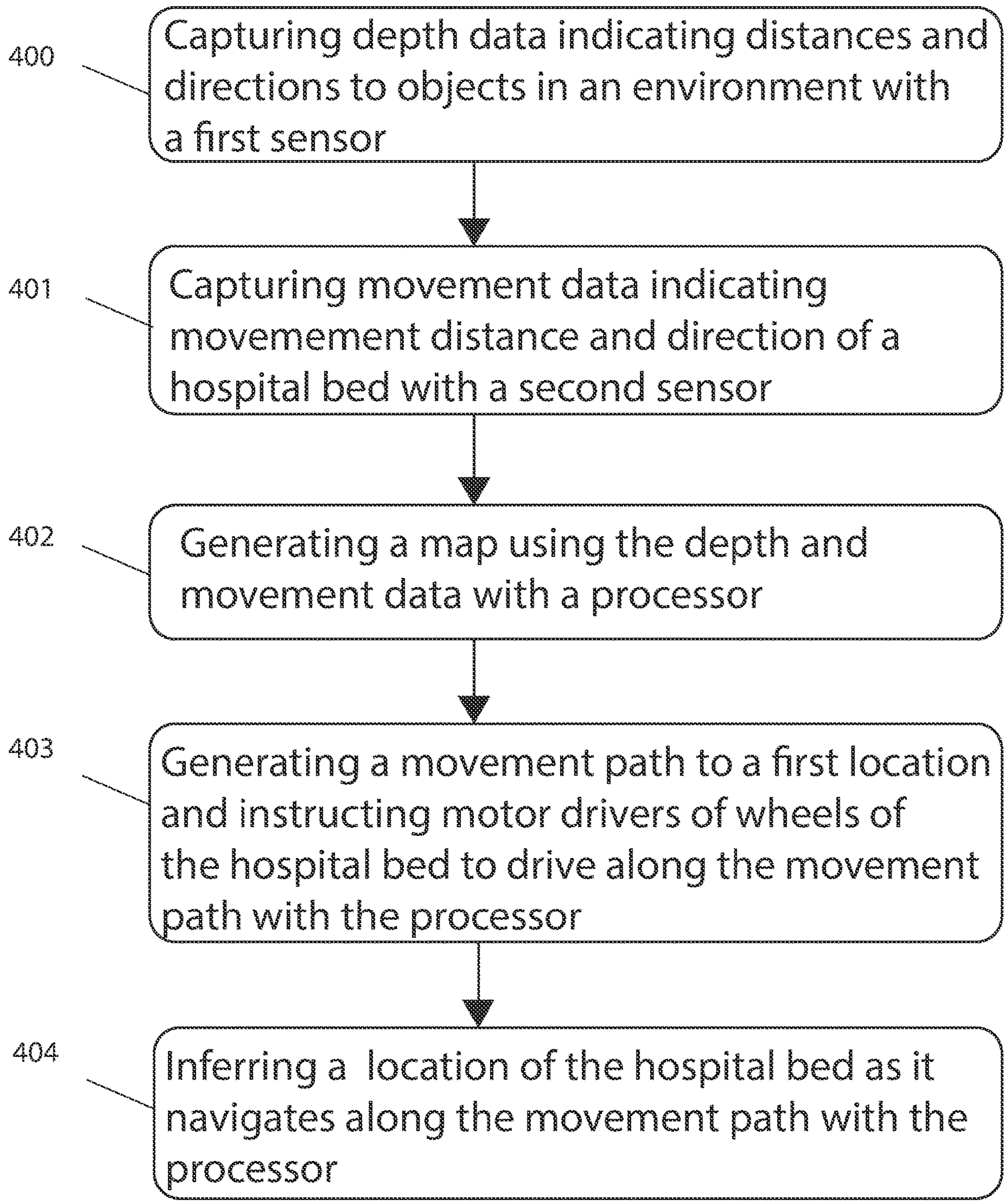
FIG. 4 illustrates a flowchart describing an example of a method for navigating an autonomous hospital bed to a first location, according to some embodiments.

FIG. 4 illustrates a flowchart describing an example of a method for navigating an autonomous hospital bed to a first location, wherein in a first step 400, a first sensor captures depth data indicating distance and direction to objects in an environment of the hospital bed, in a second step 401, a second sensor captures movement data indicating movement distance and direction of the hospital bed as it moves within the environment, in a third step 402, a processor generates a map of the environment based on the depth and movement data, in a fourth step 403, the processor generates a movement path to the first location and instructs motor drivers of wheels of the hospital bed to drive along the movement path, and in a fifth step 404, the processor infers a location of the hospital bed as is navigates along the movement path.

Figure 5:
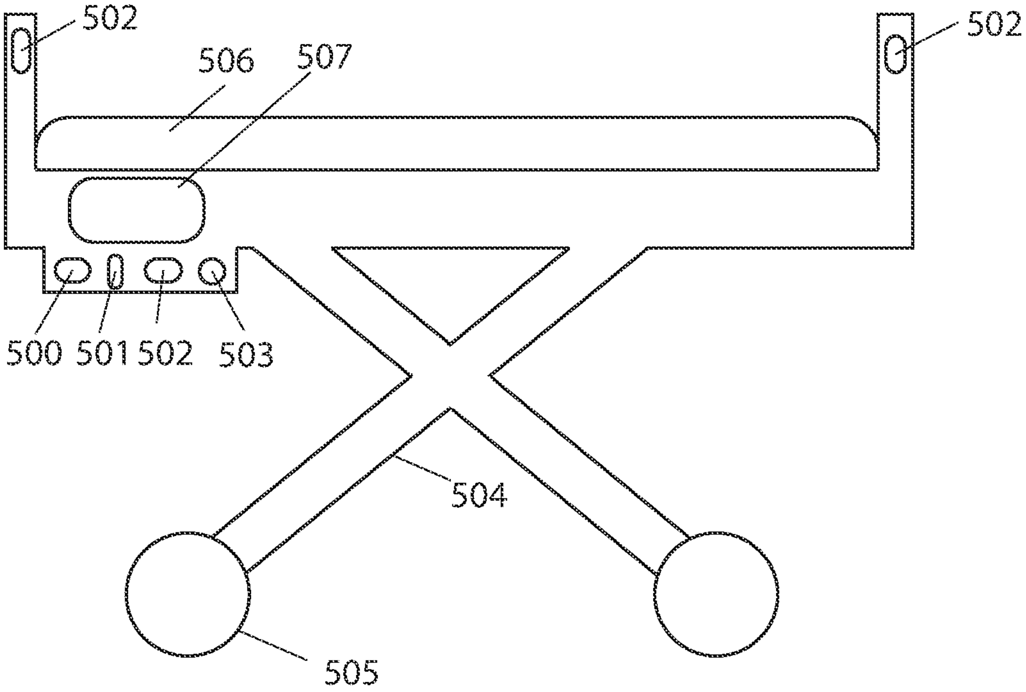
FIG. 5 illustrates an example of an autonomous hospital bed, according to some embodiments.

FIG. 5 illustrates an example of an autonomous hospital bed with processor 500, memory 501, sensors 502, controller 503, frame 504, wheels 505, and mattress 506. A dedicated touchscreen device 507 displaying a graphical user interface is also included. In some embodiments, the hospital bed may include the features of a hospital bed described herein. In some embodiments, program code stored in the memory 501 and executed by the processor 500 may effectuate the operations described herein.

In some embodiments, the mattress includes multiple inflatable nodules. In some embodiments, a number of nodules are combined to form a set of nodules, for example, a set of nodules may include four nodules. In some embodiments, the sets of nodules are connected using a locking mechanism, velcro, and the like. In some embodiments, sets of nodules are connected together to create a particular sized mattress. In this way, the size of the mattress (e.g., double, queen, king, or other size) is customizable. In some embodiments, each set of nodules is connected to a same or different air pump by a separate tube. In other embodiments, each set of nodules is connected to a same of different air pump by a single tube. In some embodiments, sets of nodules forming the mattress are provided with different volumes of air from the air pump to provide a comfortable resting position for a particular user. For instance, a user that sleeps on their side may provide additional air to the set of nodules corresponding with the knee and torso of the body for a comfortable resting position. In some cases, the air pressure in different sets of nodules is customized to provide comfort to persons with discomfort in their body (e.g., lower back) or to help improve posture, for example.

In some embodiments, a user adjusts mattress settings using a user interface of the hospital bed. Examples of a user interface includes, a touch screen graphical user interface coupled with the hospital bed, a graphical user interface provided through an application of a communication device paired with the hospital bed, a remote control, or other means that provide communication between the user and the hospital bed. Examples of a communication device include a mobile device, a laptop, a tablet, a desktop computer, etc. In some embodiments, the user sets mattress settings using the user interface. In some embodiments, the user provides user information using the user interface and the processor of the hospital bed determines mattress settings based on the user information provided. Examples of user information include previous and current injuries, preferred sleeping position, light or deep sleeper, number of restroom visits overnight, weight, age, gender, and the like. Examples of mattress settings includes level of inflation or air pressure for different sets of nodules, an inflating or deflating schedule, and the like. In some embodiments, the processor autonomously adjusts the mattress settings in real-time based on sensor data collected. For example, a camera may be used to observe the sleeping position of a user. Based on the sensor data provided by the camera, the processor determines the sleeping position of the user (e.g., back, side, stomach, etc.) and adjusts the air pressure of sets of nodules of the mattress to provide optimal comfort for the particular sleeping position of the user. In some embodiments, the processor of the hospital bed determines the optimal mattress settings of a particular user based on sensor data collected and machine learning techniques. For example, the processor may use sensor data collected over time to determine if the user is a deep or light sleeper, the sleeping position of the user, the frequency of restroom visits overnight, etc. and based on the conclusions of the observed data choose mattress settings optimal for the user. In some embodiments, the processor predicts the actions of the user based on prior data and adjusts mattress settings accordingly. For example, the processor predicts that a user that awakes and leaves the mattress in the early morning between 4:00-6:00 AM will return back to the mattress based on prior data, and will therefore maintain the current mattress settings. In another example, the processor predicts that a user will change from a side sleeping position to a back sleeping position half way through the night and autonomously adjusts the mattress settings such that they are optimal for the type of sleeping position of the user. In some embodiments, the processor observes mattress settings provided by the user and adjusts the learned mattress settings for the particular user based on mattress settings provided by the user.

While this invention has been described in terms of several embodiments, there are alterations, permutations, and equivalents, which fall within the scope of this invention. It should also be noted that there are many alternative ways of implementing the methods, devices and apparatuses of the present invention. Furthermore, unless explicitly stated, any method embodiments described herein are not constrained to a particular order or sequence. Further the Abstract is provided herein for convenience and should not be employed to construe or limit the overall invention, which is expressed in the claims. It is therefore intended that the following appended claims to be interpreted as including all such alterations, permutations, and equivalents as fall within the true spirit and scope of the present invention.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A method for operating an autonomous wheeled device, comprising:

obtaining, with at least a first sensor disposed on the autonomous wheeled device, first data indicative of objects within an environment of the autonomous wheeled device;

generating, with a processor of the autonomous wheeled device, a map of the environment using at least some of the first data;

transmitting, with the processor, first information to an application of a smartphone paired with the autonomous wheeled device, the first information comprising at least the map;

proposing, with the application of the smartphone, a suggested schedule for the autonomous wheeled device to a user, the suggested schedule comprising at least one day and time;

receiving, with the processor, second information from the application of the smartphone, the second information comprising at least each of: a new schedule or an adjustment to an existing schedule, at least one setting of the autonomous wheeled device, an instruction to execute a particular action, an instruction to modify the map of the environment, and an indication of an approval of the suggested schedule; and actuating, with the processor, the autonomous wheeled device to operate according to the new schedule or the adjustment to the existing schedule and the suggested schedule, wherein the processor only actuates the autonomous wheeled device to operate according to the suggested schedule after the application receives approval of the suggested schedule;

wherein:

the application displays the map of the environment; and the second information is designated by the user via user input received by the application of the smartphone.

2. The method of claim 1, further comprising:

obtaining, with at least a second sensor disposed on the autonomous wheeled device, second data indicative of movement of the autonomous wheeled device as the autonomous wheeled device moves within the environment.

3. The method of claim 1, wherein:

the first information further comprises at least one of: a location of the autonomous wheeled device and a path of the autonomous wheeled device; and the application further displays at least one of: a location of the autonomous wheeled device and a path of the autonomous wheeled device.

4. The method of claim 1, wherein the suggested schedule is inferred using a machine learning algorithm.

5. The method of claim 4, wherein the machine learning algorithm uses at least a plurality of user inputs historically received by the application to infer the suggested schedule.

6. The method of claim 1, further comprising:

segmenting, with the processor, the map of the environment into a plurality of rooms.

7. The method of claim 1, wherein the map is generated incrementally as the autonomous wheeled device discovers new areas and new first data corresponding with the new areas is obtained.

8. The method of claim 1, wherein the operations further comprise:

establishing, with the processor, a relationship with a processor of another autonomous device;

transmitting, with the processor, first information to the processor of the autonomous device;

receiving, with the processor, second information from the processor of the autonomous device; and actuating, with the processor, the autonomous wheeled device to execute an action based on at least a portion of the second information.

9. The method of claim 1, wherein:

the map of the environment displayed by the application comprises walls and furniture; and the map of the environment displayed by the application is displayable in two dimensions and three dimensions.

10. The method of claim 1, further comprising:

actuating, with the processor, the autonomous wheeled device to avoid an area that previously resulted in problematic coverage of the area.

11. The method of claim 1, further comprising:

determining, with the processor, a path of the autonomous wheeled device based on floor type in different areas within the environment.

12. The method of claim 1, further comprising:

autonomously selecting or adjusting, with the processor, settings of the autonomous wheeled device based on at least learned user habits.

13. An autonomous wheeled device, comprising:

a frame;

a set of wheels;

a plurality of sensors;

a processor;

a tangible, non-transitory, machine readable medium storing instructions that when executed by the processor effectuate operations comprising:

obtaining, with at least a first sensor disposed on the autonomous wheeled device, first data indicative of objects within an environment of the autonomous wheeled device;

generating, with the processor, a map of the environment using at least some of the first data;

transmitting, with the processor, first information to an application of a smartphone paired with the autonomous wheeled device, the first information comprising at least the map;

receiving, with the processor, second information from the application of the smartphone, the second information comprising at least each of: a new schedule or an adjustment to an existing schedule, at least one setting of the autonomous wheeled device, an instruction to execute a particular action, an instruction to modify the map of the environment, and an indication of an approval of a suggested schedule; and actuating, with the processor, the autonomous wheeled device to operate according to the new schedule or the adjustment to the existing schedule and the suggested schedule;

wherein:

the application of the smartphone proposes the suggested schedule for the autonomous wheeled device to the user, the suggested schedule comprising at least one day and time;

the processor only actuates the autonomous wheeled device to operate according to the suggested schedule after the application receives approval of the suggested schedule;

the application displays the map of the environment; and the second information is designated by the user via user input received by the application of the smartphone.

14. The autonomous wheeled device of claim 13, wherein at least one of:

the suggested schedule is inferred using a machine learning algorithm; and the machine learning algorithm uses at least a plurality of user inputs historically received by the application to infer the suggested schedule.

15. The autonomous wheeled device of claim 13, wherein the operations further comprise:

establishing, with the processor, a relationship with a processor of another autonomous device;

transmitting, with the processor, first information to the processor of the autonomous device;

receiving, with the processor, second information from the processor of the autonomous device; and actuating, with the processor, the autonomous wheeled device to execute an action based on at least a portion of the second information.

16. The autonomous wheeled device of claim 13, wherein the operations further comprise:

segmenting, with the processor, the map of the environment into a plurality of rooms.

17. The autonomous wheeled device of claim 13, wherein the operations further comprise:

actuating, with the processor, the autonomous wheeled device to avoid an area that previously resulted in problematic coverage of the area.

18. The autonomous wheeled device of claim 13, wherein:

the first information further comprises at least one of: a location of the autonomous wheeled device and a path of the autonomous wheeled device; and the application further displays at least one of: a location of the autonomous wheeled device and a path of the autonomous wheeled device.

19. The autonomous wheeled device of claim 13, wherein:

the map of the environment displayed by the application comprises walls and furniture; and the map of the environment displayed by the application is displayable in two dimensions and three dimensions.

20. The autonomous wheeled device of claim 13, wherein the operations further comprise:

determining, with the processor, a path of the autonomous wheeled device based on floor type in different areas within the environment.

* * * * *